(12) United States Patent
El-Ali

(10) Patent No.: US 9,870,382 B2
(45) Date of Patent: Jan. 16, 2018

(54) DATA ENCODING AND CORRESPONDING DATA STRUCTURE

(71) Applicant: SAP SE, Walldorf (DE)

(72) Inventor: Mohamad El-Ali, Laval (CA)

(73) Assignee: SAP SE, Walldorf (DE)

( * ) Notice: Subject to any disclaimer, the term of this patent is extended or adjusted under 35 U.S.C. 154(b) by 216 days.

(21) Appl. No.: 14/224,308

(22) Filed: Mar. 25, 2014

(65) Prior Publication Data
US 2015/0278268 A1 Oct. 1, 2015

(51) Int. Cl.
*G06F 17/30* (2006.01)

(52) U.S. Cl.
CPC .. *G06F 17/30324* (2013.01); *G06F 17/30315* (2013.01); *G06F 17/30424* (2013.01); *G06F 17/30864* (2013.01); *G06F 17/30952* (2013.01)

(58) Field of Classification Search
CPC ............. G06F 17/30067; G06F 17/30952
See application file for complete search history.

(56) References Cited

U.S. PATENT DOCUMENTS

| | | | | |
|---|---|---|---|---|
| 4,633,393 A | * | 12/1986 | Rundell | G06F 17/30952 |
| 4,731,737 A | * | 3/1988 | Witt | G06F 7/24 707/E17.037 |
| 5,237,678 A | * | 8/1993 | Kuechler | G06F 17/30595 |
| 5,504,852 A | * | 4/1996 | Thompson-Rohrlich | G06F 17/30067 715/835 |
| 5,530,849 A | * | 6/1996 | Hanushevsky | G06F 17/30067 |
| 5,687,365 A | | 11/1997 | Velissaropoulos et al. | |
| 5,799,299 A | * | 8/1998 | Fujiwara | G06F 17/30985 |

(Continued)

FOREIGN PATENT DOCUMENTS

| | | |
|---|---|---|
| EP | 1 995 878 | 11/2008 |
| EP | 2660732 A1 | 11/2013 |

(Continued)

OTHER PUBLICATIONS

D. Schwalb et al., "Cache Conscious Column Organization in In-Memory Column Stores", Dec. 31, 2013, XP055198146, ISBN 978-3-86956-228-5.

(Continued)

*Primary Examiner* — Robert Beausoliel, Jr.
*Assistant Examiner* — Nirav K Khakhar
(74) *Attorney, Agent, or Firm* — Jones Day

(57) ABSTRACT

A data structure and method of accessing, modifying, and adding data in the data structure are provided. The data structure includes an encoding dictionary, a decoding dictionary, and an attribute vector. The attribute vector includes information for cross-referencing characteristics associated with the same entry. Responsive to an instruction to add data, the method adds data to the encoding and decoding dictionaries as an entry and assigns a valueID for the added entries. The method then adds the valueID to attribute vector(s) associated with the dictionaries. Responsive to a query for data associated with a value, the method searches for the value in an encoding dictionary, determines a valueID corresponding to the data based on a match in the encoding dictionary, uses the attribute vector to find all relevant data across all dictionaries and attribute vectors, assembles the retrieved information in a tuple, then outputs all data associated with the value.

25 Claims, 9 Drawing Sheets

320

NAME DECODING DICTIONARY

| Position | ValueID | Value |
|---|---|---|
| ⋮ | ⋮ | ⋮ |
| 4 | 5 | Peter |
| 5 | 7 | Mary |
| 6 | 9 | Jane |
| 7 | 11 | John |

340

NAME ENCODING DICTIONARY

| Position | ValueID | Value |
|---|---|---|
| ⋮ | ⋮ | ⋮ |
| 23 | 9 | Jane |
| 24 | 11 | John |
| 25 | 7 | Mary |
| 26 | 5 | Peter |

(56) References Cited

U.S. PATENT DOCUMENTS

| | | | | |
|---|---|---|---|---|
| 6,643,644 | B1* | 11/2003 | Furusho | G06F 17/30952 |
| 6,691,138 | B1* | 2/2004 | Kirkpatrick | G06F 17/30067 |
| | | | | 707/752 |
| 6,973,467 | B1* | 12/2005 | Furusho | G06F 17/30952 |
| | | | | 707/700 |
| 7,206,457 | B2 | 4/2007 | Lee et al. | |
| 7,280,057 | B2 | 10/2007 | Delfs et al. | |
| 7,868,789 | B1 | 1/2011 | Binnig et al. | |
| 8,108,361 | B2 | 1/2012 | Netz et al. | |
| 8,117,217 | B2 | 2/2012 | Ishizaki et al. | |
| 8,521,788 | B2 | 8/2013 | Ellison et al. | |
| 8,533,179 | B2 | 9/2013 | Bendel et al. | |
| 8,653,993 | B2 | 2/2014 | Bendel et al. | |
| 2002/0116417 | A1* | 8/2002 | Weinberg | G06F 17/243 |
| | | | | 715/212 |
| 2003/0220942 | A1* | 11/2003 | Majumder | G06F 17/30067 |
| 2004/0054922 | A1* | 3/2004 | Hiraga | G06F 21/6227 |
| | | | | 726/22 |
| 2006/0015529 | A1* | 1/2006 | Yagawa | G06F 17/30067 |
| 2007/0233652 | A1* | 10/2007 | Chaushev | G06F 17/30067 |
| 2008/0222104 | A1* | 9/2008 | Stewart | G06F 17/30321 |
| 2009/0287986 | A1* | 11/2009 | Vishniac | G06F 17/30067 |
| | | | | 714/819 |
| 2012/0221528 | A1 | 8/2012 | Renkes et al. | |
| 2012/0330908 | A1* | 12/2012 | Stowe | G06F 17/30955 |
| | | | | 707/693 |
| 2013/0166554 | A1 | 6/2013 | Yoon et al. | |
| 2013/0290282 | A1 | 10/2013 | Faerber et al. | |
| 2015/0324480 | A1* | 11/2015 | Schreter | G06F 17/30952 |
| | | | | 707/741 |

FOREIGN PATENT DOCUMENTS

| | | |
|---|---|---|
| EP | 2660734 A1 | 11/2013 |
| EP | 2660736 A1 | 11/2013 |

OTHER PUBLICATIONS

V. Narasayya et al., "Workload Driven Index Defragmentation", Data Engineering (ICDE), 2010 IEEE 26th International Conference on, IEEEE, Piscataway, NJ, USA; Mar. 1, 2010 pp. 497-508, XP031657903, ISBN: 978-1-4244-5445-7.

"Defragmenting MES Databases", Defragmenting SQL Server Databases, Aug. 31, 2013 (Aug. 31, 2013).

C. Binnig et al., "Dictionary-based Order-preserving String Compression for Main Memory Column Stores", Proceedings of the 35th SIGMOD International Conference on Management of Data, SIGMOD '09, Jan. 1, 2009, XP055165746, ISBN: 978-1-60-558551-2.

V. Sikka et al.,"Efficient Transaction Processing in SAP HANA Database—The End of a Column Store Myth", Proceedings of the 2012 International Conference on Management of Data, SIGMOD '12, Jan. 1, 2012, pp. 731-24. XP055197662, ISBN: 978-1-45-031247-9.

Extended European Search Report issued in European Patent Application No. 15160890.8, dated Jul. 8, 2015.

* cited by examiner

100

FIG. 3A
320

NAME DECODING DICTIONARY

| Position | ValueID | Value |
|---|---|---|
| ... | ... | ... |
| 4 | 5 | Peter |
| 5 | 7 | Mary |
| 6 | 9 | Jane |
| 7 | 11 | John |

FIG. 3B
340

NAME ENCODING DICTIONARY

| Position | ValueID | Value |
|---|---|---|
| ... | ... | ... |
| 23 | 9 | Jane |
| 24 | 11 | John |
| 25 | 7 | Mary |
| 26 | 5 | Peter |

FIG. 3C
360

NAME ATTRIBUTE VECTOR

| Position | ValueID |
|---|---|
| ... | ... |
| 39 | 9 |
| 40 | 11 |
| 41 | 7 |
| 42 | 5 |
| 43 | 11 |
| 44 | 9 |

FIG. 4A
420

GENDER DECODING DICTIONARY

| Position | ValueID | Value |
|---|---|---|
| 1 | 1 | Male |
| 2 | 2 | Female |

FIG. 4B
440

GENDER ENCODING DICTIONARY

| Position | ValueID | Value |
|---|---|---|
| 1 | 2 | Female |
| 2 | 1 | Male |

FIG. 4C
460

GENDER ATTRIBUTE VECTOR

| Position | ValueID |
|---|---|
| ... | ... |
| 39 | 2 |
| 40 | 1 |
| 41 | 2 |
| 42 | 1 |
| 43 | 1 |
| 44 | 2 |

| recID | WORLD POPULATION |||||
|---|---|---|---|---|---|
| | Gender | Name | City | Country | Birthday |
| ⋮ | ⋮ | ⋮ | ⋮ | ⋮ | ⋮ |
| 39 | F | Jane | Chicago | USA | 12.03.1967 |
| 40 | M | John | London | UK | 23.04.1958 |
| 41 | F | Mary | Paris | France | 05.06.1979 |
| 42 | M | Peter | Chicago | USA | 02.01.1999 |
| 43 | M | John | Palo Alto | USA | 19.08.1938 |
| 44 | F | Jane | New York | USA | 12.01.1956 |
| 45 | F | Alma | Madrid | Spain | 15.07.1949 |

FIG. 7B
720

NAME ATTRIBUTE VECTOR

| Position | ValueID |
|---|---|
| ⋮ | ⋮ |
| 39 | 9 |
| 40 | 11 |
| 41 | 7 |
| 42 | 5 |
| 43 | 11 |
| 44 | 9 |
| 45 | 12 |

FIG. 7C
730

NAME DECODING DICTIONARY

| Position | ValueID | Value |
|---|---|---|
| ⋮ | ⋮ | ⋮ |
| 4 | 5 | Peter |
| 5 | 7 | Mary |
| 6 | 9 | Jane |
| 7 | 11 | John |

FIG. 7D
740

NAME ENCODING DICTIONARY

| Position | ValueID | Value |
|---|---|---|
| ⋮ | ⋮ | ⋮ |
| 23 | 9 | Jane |
| 24 | 11 | John |
| 25 | 7 | Mary |
| 26 | 5 | Peter |

FIG. 7E
750

NAME DECODING DICTIONARY

| Position | ValueID | Value |
|---|---|---|
| ⋮ | ⋮ | ⋮ |
| 4 | 5 | Peter |
| 5 | 7 | Mary |
| 6 | 9 | Jane |
| 7 | 11 | John |
| 8 | 12 | Alma |

FIG. 7F
760

NAME ENCODING DICTIONARY

| Position | ValueID | Value |
|---|---|---|
| ⋮ | ⋮ | ⋮ |
| 23 | 9 | Jane |
| 24 | 11 | John |
| 25 | 7 | Mary |
| 26 | 5 | Peter |
| 27 | 12 | Alma |

FIG. 7G
770

NAME DECODING DICTIONARY

| Position | ValueID | Value |
|---|---|---|
| ⋮ | ⋮ | ⋮ |
| 4 | 5 | Peter |
| 5 | 7 | Mary |
| 6 | 9 | Jane |
| 7 | 11 | John |
| 8 | 12 | Alma |

FIG. 7H
780

NAME ENCODING DICTIONARY

| Position | ValueID | Value |
|---|---|---|
| ⋮ | ⋮ | ⋮ |
| 23 | 12 | Alma |
| 24 | 9 | Jane |
| 25 | 11 | John |
| 26 | 7 | Mary |
| 27 | 5 | Peter |

800

US 9,870,382 B2

DATA ENCODING AND CORRESPONDING DATA STRUCTURE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

Computing is typically governed by limitations to memory and processing speed. Enterprise computing, which includes enterprise resource planning (ERP), is an area of computing that integrates various organizational systems to facilitate production and transaction of goods and services. The applications for which business management software such as ERP is useful has been traditionally classified as involving either structured or unstructured data, and accordingly, ERP software has been adaptively designed for a particular broad category of data. However, ERP, customer relationship management (CRM), supplier relationship management (SRM), business intelligence (BI), and e-Commerce is becoming increasingly relevant to areas as diverse as sensor and feedback networks, real-time event analytics, social networking, cloud integration, mobile applications, and supply chain management. These varied applications demand analysis of both structured and unstructured data. To this end, systems such as SAP HANA® combine Online Transaction Processing (OLTP) and Online Analytical Processing (OLAP) for both structure and unstructured data, using hardware and database systems to create a single source of data, enable real-time analytics, and simplify applications and database structures.

Some ERP software improve computational speeds and efficiency even within existing memory and speeds limitations by using column-based data storage and in-memory database operators. One way to manipulate data in column-based data storage is by dictionary encoding. Dictionary encoding decreases space requirements, increases column scan speed, and can operate directly on compressed data. Dictionary encoding can be better organized with the aid of data structures such as attribute vectors, which assist in structuring and organizing data. However, inserting and deleting data can be expensive, because adding new values to the data store typically requires reorganization of dictionaries and attribute vectors.

BRIEF DESCRIPTION OF THE DRAWINGS

FIG. 2A shows an architecture of a data structure according to an example embodiment.

FIG. 2B shows another architecture of a data structure according to an example embodiment.

FIG. 2C shows another architecture of a data structure according to an example embodiment.

FIG. 3A shows an architecture of a data structure according to an example embodiment.

FIG. 3B shows another architecture of a data structure according to an example embodiment.

FIG. 3C shows another architecture of a data structure according to an example embodiment.

FIG. 4A shows an architecture of a data structure according to an example embodiment.

FIG. 4B shows another architecture of a data structure according to an example embodiment.

FIG. 4C shows another architecture of a data structure according to an example embodiment.

FIG. 7A shows an architecture of a data structure according to an example embodiment.

FIG. 7B shows another architecture of a data structure according to an example embodiment.

FIG. 7C shows another architecture of a data structure according to an example embodiment.

FIG. 7D shows another architecture of a data structure according to an example embodiment.

FIG. 7E shows another architecture of a data structure according to an example embodiment.

FIG. 7F shows another architecture of a data structure according to an example embodiment.

FIG. 7G shows another architecture of a data structure according to an example embodiment.

FIG. 7H shows another architecture of a data structure according to an example embodiment.

DETAILED DESCRIPTION

Example embodiments of the present invention provide for a data structure and method of manipulating data in a database (also referred to as "a data store") that reduces the complexity and enhances the performance of data storage, including in-memory databases such as SAP HANA®. The complexity is reduced and the access speed is enhanced by removing the need for a differential buffer, rebuilding of attribute vectors, and performance of merge operations between a main store and the differential buffer. For example, when data is added to a database, instead of rebuilding an attribute vector, the data can be simply added as a new entry in the attribute vector. By reducing the number of operations that are performed on attribute vectors, computational power and time is saved, particularly for cases in which the size of the attribute vectors is or becomes large.

Example embodiments of the present invention provide for a data structure and method of accessing, modifying, and adding data in the data structure. The data structure can include an encoding dictionary, a decoding dictionary, and an attribute vector. The attribute vector can include information for cross-referencing characteristics associated with the same entry. Example embodiments of the method can add data to the encoding and decoding dictionaries as one or more entries and assign a value identifier ("valueID") for the added entries. The method can add the valueID to attribute vector(s) associated with the dictionaries. The method can search for the value in an encoding dictionary, determine a valueID corresponding to the data based on a match in the encoding dictionary, use the attribute vector to find all relevant data across all dictionaries and attribute vectors, assemble the retrieved information in a tuple, and output at least a portion of the data associated with the value.

The data structures and methods described herein can be practiced in combination with other data structures and methods. For example, a processor can determine that it is optimal for a period of time to operate a database according to the data structures and methods described herein, and that at other times and/or situations (e.g., data mining, static operations) can use other techniques for constructing, accessing, and manipulating data structures.

Figure 1:
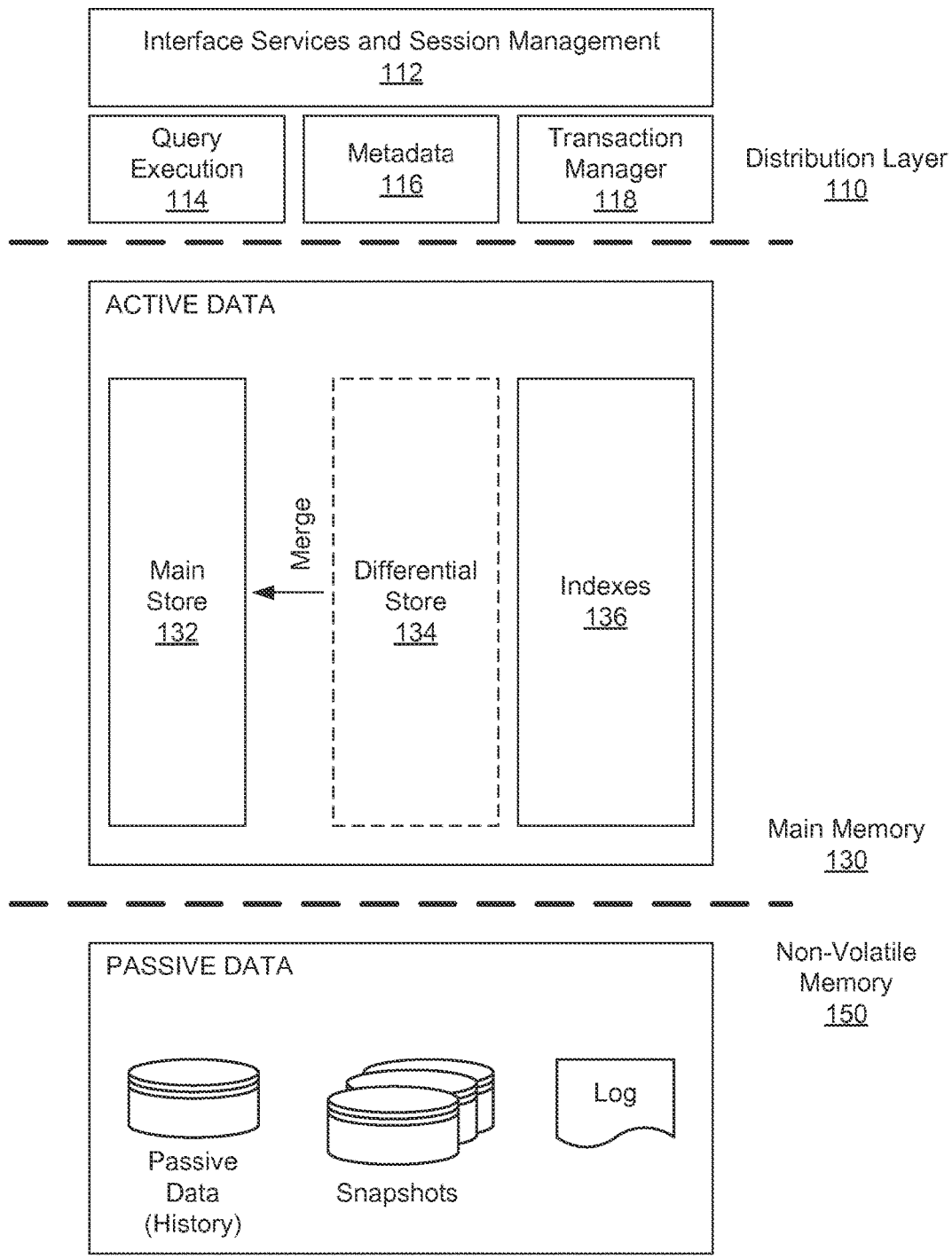
FIG. 1 is a block diagram of an architecture of a system according to an example embodiment.

FIG. 1 is a block diagram of a system 100 such as SAP HANA® according to an example embodiment. The system 100 can include a distribution layer 110, main memory 130, and non-volatile memory 150 (including, but not limited to ROM, flash, magnetic storage, and optical discs). The distribution layer 110 can interface with a user and can include components that enable retrieval and manipulation of data. These components can include an interface services and sessions management module 112, a query execution module 114, a metadata module 116, and a transaction manager module 118. The interface services and session management module 112 can interface with a user, for example, providing a graphical user interface to solicit and provide data to the user. The interface services and session management module 112 can also establish and manage sessions for data manipulation, for example between sockets via a transport protocol. The query execution module 114 can receive a query with or without the aid of the interface services and session management module 112. For example, the interface services and session management module 112 can receive a query from a user and pass the query to the query execution module 114. In an alternative example, the query execution module 114 can directly extract a query from a user. The query execution module 114 can further process the query, for example parsing the query to then perform the functions of the query on the active data. The metadata module 116 can receive metadata associated with a query and/or a session, and like the query execution module 114, can do so with or without the aid of the interface services and session management module 112. In an embodiment, the metadata can be the basis for determining what data structures and/or methods or used in a particular session or for processing a particular query. The transaction manager 118 can manage one or more transaction within a session, and also like the query execution module 114, can do so with or without the aid of the interface services and session management module 112.

The main memory 130 can include active data, which active data can be more readily accessed and manipulated, compared with passive data. Non-volatile memory 150 can include passive data, which can be data that the user does not immediately need. Data can be transferred between main memory 130 and non-volatile memory 150.

The active data in main memory 130 can include a main store 132, a differential store 134 (also referred to as a "differential buffer"), and indexes 136. Data can be stored in the main store 132 and differential store 134 in tabular form and, more specifically, in the form of dictionaries, which are described further herein, e.g., with respect to FIG. 2B. The index 136 can store attribute vectors that facilitate lookup of data stored across different data structures corresponding to the same object. Attribute vectors are also described further herein, e.g., with respect to FIGS. 2C, 3C, 4C, and 7B.

The differential store 134 can improve performance speeds by temporarily storing data. Thus, the differential store removes the need to re-sort data after each insertion and deletion. Instead, the differential store can be periodically merged with the main store 132, which reduces the frequency of performing processor-intensive functions. The provision of the differential store 134 reduces the expense of adding and deleting data from the main store 132. For example, inserting new tuples (e.g., a pair of values) into a compressed structure can require reorganization of a dictionary, and as the positions of values in the dictionary changes, to maintain efficiency, the attribute vectors are typically rebuilt. Similarly, deleting new tuples can require all attribute vectors to be rebuilt. The addition of the differential store increases the speed of insertion and deletion, because the dictionaries need not be re-sorted and attribute vectors need not to be rebuilt after each insertion and deletion. This is possible, e.g., because new values can be written to the differential store 134, and search techniques, such as cache sensitive B+ tree search (e.g., an indexing and tree-searching technique that stores and uses an address of a first child in each node to access other children), can be performed on a difference/delta between the main store and the differential search to speed up the search. However, this technique can involve rebuilding an Attribute Vector at least periodically to maintain operational speed and efficiency. In an embodiment, along with the need to rebuild an attribute vector, the differential store 134 can be removed, as further explained herein.

FIGS. 2A to 2C show architectures of data structures 210, 220, and 230, according to example embodiments. Data structures 210, 220, and 230 are example embodiments implemented in SAP HANA®. These data structures can be stored in the main store 132 of a system 100 according to an example embodiment. Data structures 210, 220, and 230 are shown as populated with example values. For example, data regarding various individuals in the world can be conceptualized as a single table 210 having columns for various characteristics (e.g., gender, name, city, country, and birthday, as shown) of the individual. The recID column can be implicit, tracking the number of records in the table. Each row in table 210 can represent an individual. For example, Jane, who is a female living in Chicago, USA and born on Mar. 12, 1967 can be stored in row 39 of the world population table. Additional columns for other characteristics are also possible.

Space can be saved by storing portions of the world population data separately, for example, as a dictionary 220 and an attribute vector 230. In an embodiment, each column of the table can be stored as a dictionary and an attribute vector. For instance, in the world population example, the data can be captured by dictionaries for each of: gender, name, location, and birthday, along with corresponding attribute vectors for each dictionary (e.g., gender attribute vector, name attribute vector, location attribute vector, birthday attribute vector, etc.). For example, a name dictionary can include names as its values (e.g., "Jane," "John," etc.), while a gender dictionary can include genders as its values (e.g., "female" or "male"). Each dictionary can also have a corresponding attribute vector. For example, a name dictionary has a name attribute vector, and a gender dictionary has a gender attribute vector.

For instance, the "Name" column in world population table 210 can be split into (or the data can captured in) name dictionary 220 and name attribute vector 230. According to an embodiment, each dictionary and attribute vector can include an implicit valueID associated with each value. The valueID is the position of the value in the dictionary.

The dictionary 220 can store all distinct values of table 210. In the example illustrated in FIG. 2B, dictionary 220 can store all distinct values of the "Name" column from table 210. As shown, although "Jane" and "John" each appears more than once, they are each stored as a single entry in dictionary 220. The dictionary 220 can include a column for the value. For the case of FIG. 2B, the value is the name. For example, the value "Jane" has a position "23" therefor the valueID in the Name attribute vector for "Jane" will be "23".

The attribute vector 230 can include implicit recIDs associated with dictionary valueIDs for all entries. More specifically, in an embodiment, the attribute vector can include a recID column to store a position associated with a valueID. The recID column can be implicit and can correspond to the recID of global table 210. For example, the valueID 23 corresponds to recID 39. The recID can be used as an additional identifier, for example as a cross-reference between attribute vectors. That is, in some instances, each of the recIDs can be used to look up other values associated with a particular position, for example in other attribute vectors, as further described herein.

FIGS. 3A to 3C show additional architectures of data structures 320, 340, and 360 according to example embodiments. In the example embodiments shown, two versions (which can be identical or non-identical) of a dictionary can be stored. For example, one version of the dictionary can be a decoding dictionary 310 and another version of the dictionary can be an encoding dictionary 340. As their names imply, the dictionaries can serve different purposes. Decoding dictionary 320 can be similar to encoding dictionary 340, each having the same values and valueIDs. One way the decoding dictionary can differ from the encoding dictionary is the order of the entries, based on the position. For example, the decoding dictionary 320 can be ordered according to valueID (numerically in the example shown), and the encoding dictionary 340 can be ordered according to value (alphabetically in the example shown). Organizing the dictionaries in the manner described can enable quick searching by valueID in the decoding dictionary and by value in the encoding dictionary. One effect of providing separate encoding and decoding dictionaries is that one of the dictionaries, e.g., the decoding dictionary, need not be sorted since the valueID will increment with every new entry.

Figure 5:
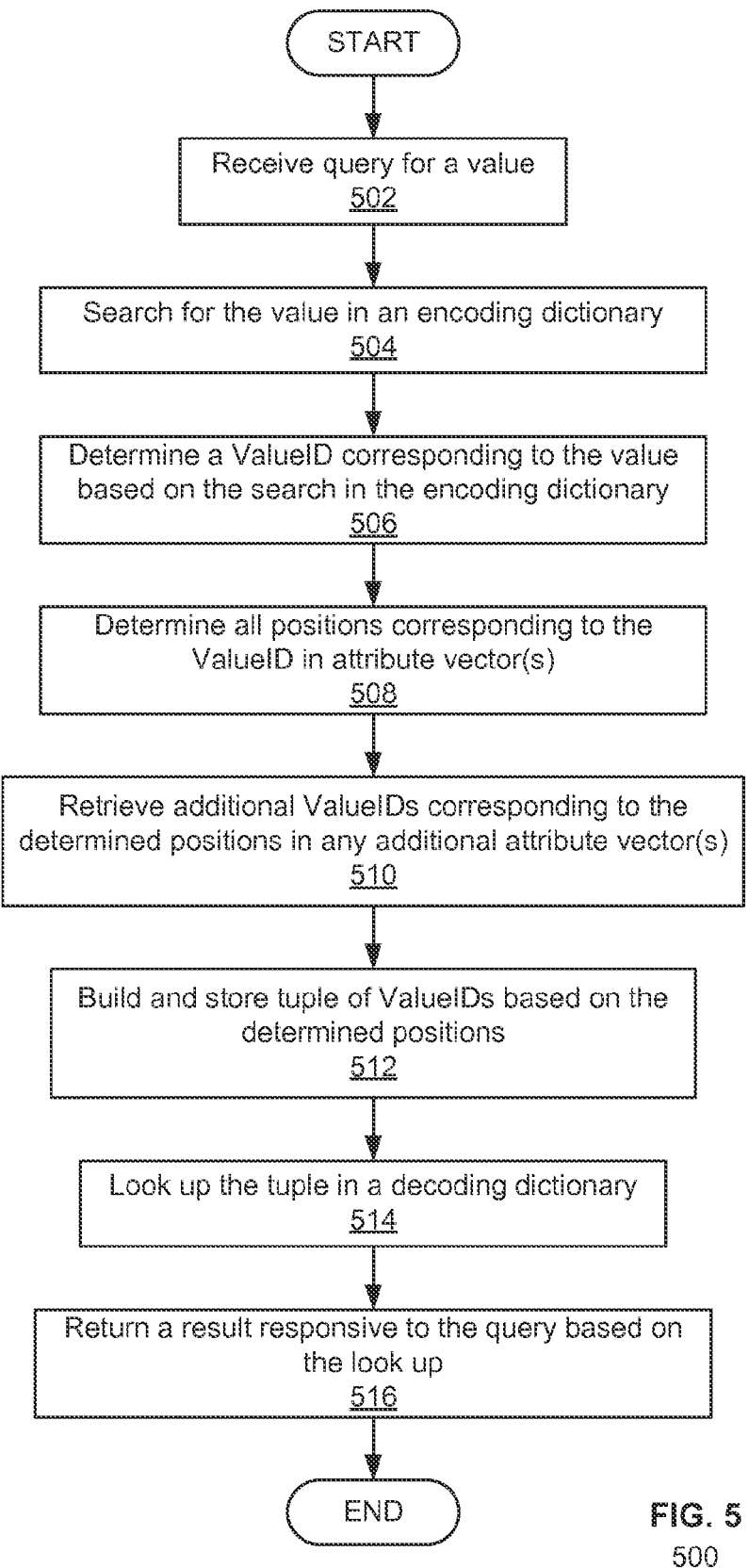
FIG. 5 is a flowchart illustrating a method of retrieving data from a data store according to an example embodiment.

FIG. 5 is a flowchart illustrating a method 500 of retrieving data from a data store according to an example embodiment. In a first step 502, the method 500 receives a query to search for a value (where the value may or may not be stored in the data store). For example, the query can be a SELECT command (e.g., "SELECT*FROM tb where Name=Mary"), with an object of returning all data associated with the name "Mary" from a table tb. Additional parsing of the query can also be performed. In step 504, the method 500 searches for the value in the Name dictionary, for example an encoding dictionary 340 as described herein. In the example provided, the search value is "Mary." If the value is not found in the data store, the method 500 can end. If the value is found, the method 500 can proceed to step 506, in which the method 500 determines a ValueID corresponding to the search value in the encoding dictionary. The determination can be based on a lookup of the ValueID associated with the search value. For example, the ValueID is "7," for "Mary," in encoding dictionary 340. Based on the ValueID, the method 500 can determine all positions corresponding to the ValueID in step 508. For example, the determination can be based on a lookup in the attribute vector 360 that reveals that "Mary," whose ValueID is "7," corresponds to position "41" in name attribute vector 360. More than one position can correspond to the valueID. For example, positions 39 and 44 both correspond to value ID "9," indicating that, in the snapshot, there are two individuals both with the same name, "Jane." In step 510, the method 500 retrieves all valueIDs corresponding to the position determined in step 508. This is illustrated with the aid of FIGS. 4A to 4C. FIGS. 4A to 4C show architectures of data structures 420, 440, and 460 according to example embodiments. Gender decoding dictionary 420, gender encoding dictionary 440, and gender attribute vector 460 have the same features and functions as the name decoding and encoding dictionaries and attribute vectors shown in FIGS. 3A to 3C, unless otherwise described herein.

To retrieve additional valueIDs corresponding to position "41," the method 500 can access each of the other attribute vectors. For the gender attribute vector 460, the valueID "2" can be retrieved based on the position "41". Thus, pointers to all information pertaining to search value "Mary" can be gathered. In step 512, the method 500 builds and stores a variable including all of the valueIDs corresponding to the determined positions. In an embodiment, the valueIDs are built and stored in a tuple. For the example provided, the tuple can be ["7," "2"], because the name attribute vector 360 indicates that position "41" corresponds to valueID "7," and gender attribute vector 460 indicates that position "41" corresponds to valueID "2".

In step 514, method 500 proceeds to look up the tuple in one or more dictionaries such as the name decoding dictionary 320 and the gender decoding dictionary 420. The name decoding dictionary 320 reveals that the first valueID "7" in the tuple corresponds to "Mary." The gender decoding dictionary 420 reveals that the second valueID "2" in the tuple corresponds to "female." Additional dictionaries including additional information are possible. Thus, the information associated with Mary, for example, as shown in the world population table 210 can be assembled. The result of the lookup performed in step 514 can be returned in step 516. For example, the result can indicate that Mary is a female living in Paris, France, born on Jun. 5, 1979.

Figure 6:
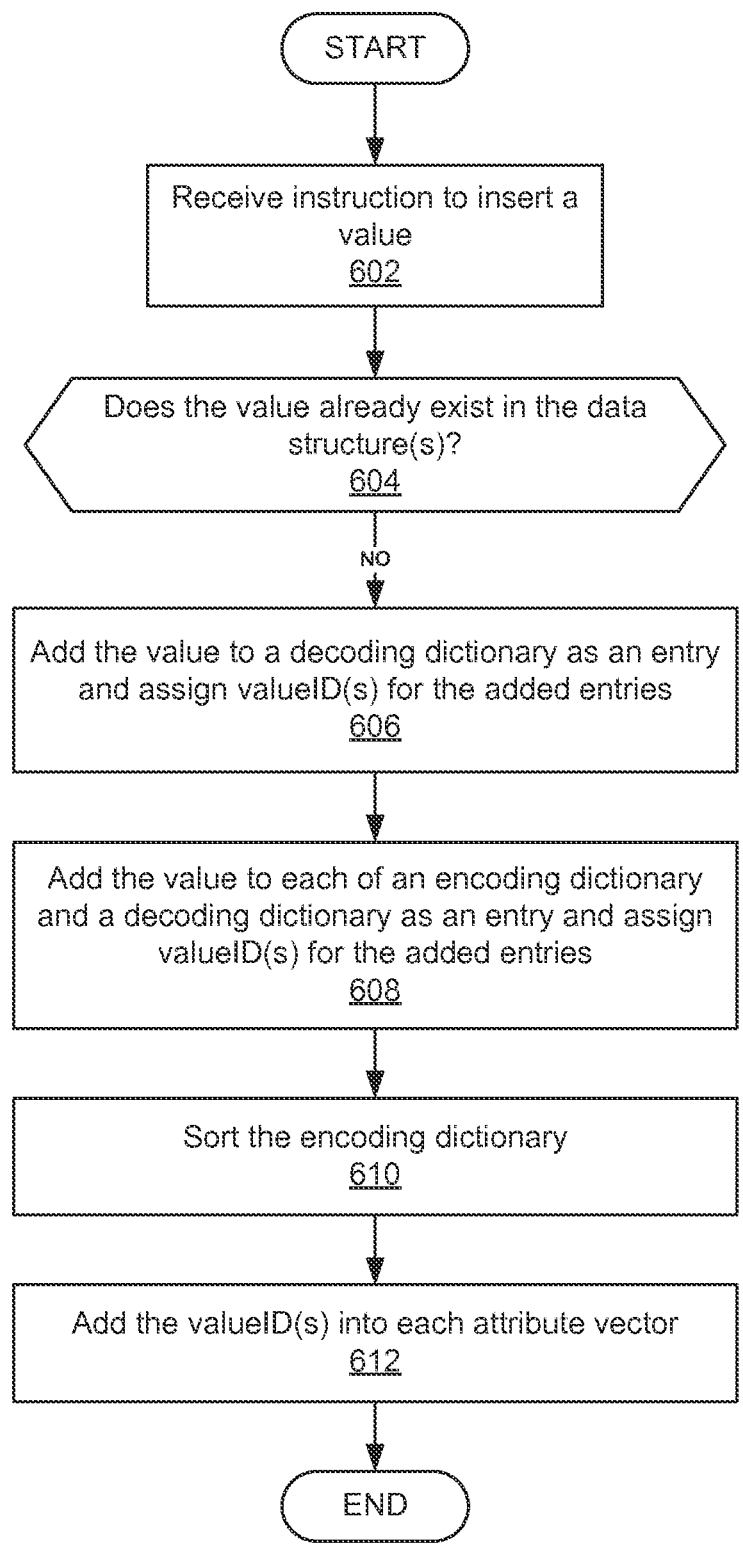
FIG. 6 is a flowchart illustrating a method of adding data to a data store according to an example embodiment.

FIG. 6 is a flowchart illustrating a method 600 of adding data to a data store according to an example embodiment. The method 600 is explained with the aid of FIGS. 7A to 7H, which show architectures of data structures 710 to 780 according to example embodiments. World population table 710 shows a state of a global table after adding an entry for "Alma." Name dictionaries 730, 740 show an example state of the dictionaries before adding "Alma". Name dictionaries 750, 760 show an example state of the dictionaries after adding "Alma" (e.g., steps 604 and 606), but before any sorting is performed (e.g., step 608). Name dictionaries 770, 780 show an example state of the dictionaries after sorting (e.g., step 606). Attribute vector 720 shows a state of the attribute vector after adding "Alma" (compared with attribute vector 360, which shows a state of the attribute vector before adding "Alma.")

In a first step 602, the method 600 receives an instruction to insert data, for example a value. The instruction to insert the data can be an INSERT command (e.g., "INSERT INTO tb Name=Alma"), with an object of inserting a new entry, "Alma" into table tb. Although the example provided inserts a name into the table, the instruction can include one or commands to insert additional data (e.g., gender, city, etc.) into the table, which can be carried out according to essentially the same steps. The instruction can be provided as a single command or as multiple commands, which can be provided in series. The value to be inserted can also be parsed from the instruction(s). In step 604, the method 600 can determine whether the value is already in the table. For example, the method 600 can perform a lookup in an encoding dictionary data structure to determine whether there is a match to the value. If the value exists, then the method 600 can determine whether entries corresponding to the value already exist in the attribute vectors. If the value exists in the encoding dictionary, but not the attribute vector, then an entry can be added in the attribute vector. Otherwise, if the value does not exist in either the encoding dictionary or the attribute vector, the method proceeds to step 606. In step 606, the value can be added to a decoding dictionary. The value can be added in a new row in the dictionary, along with a corresponding valueID. The valueID can be selected according to an internal counter, e.g., the value can be assigned as a sequential number. In an embodiment, each unique value corresponds to a unique valueID. For example, in a decoding dictionary 750, "Alma" can be added as a new entry with implicit position "8," and assigned valueID "12," because Alma does not yet exist in the dictionary. ValueID is "12," because it is the next unique number. After adding the value to a decoding dictionary, the method 600 can proceed to step 608 to add the value to an encoding dictionary. The value can be added in a new row in the dictionary, along with a corresponding valueID. The valueID in the encoding dictionary is the one assigned when the value is added to a corresponding decoding dictionary. In an embodiment, each unique value corresponds to a unique valueID. For example, in a encoding dictionary 760, "Alma" can be added as a new entry with implicit position "27," and assigned valueID "12," which value ID was determined when "Alma" was added to the decoding dictionary 760.

After adding the values to the dictionaries, the method 600 can proceed to step 610 to sort (e.g., re-sort) the encoding dictionary. For example, the encoding dictionary 780 shows an example state of the dictionary after it has been sorted such that the values are alphabetized, i.e., Alma, Jane, John, Mary, and Peter. After sorting, Alma can have implicit index 23, Jane can have implicit index 24, etc., because Alma is alphabetically before Jane. In an embodiment, the decoding dictionary 770 is not sorted, because values are already sorted by ValueID by virtue of the selection and assignment of the ValueID such that they are sequential, e.g., ascending (or descending) in order. In step 612, the method 600 adds to each attribute vector the valueID assigned to the newly-added value. For example, valueID "12" assigned to "Alma" is added in attribute vector 720. The method 600 also assigns a position to the ValueID, which position can be the same across different attribute vectors to identify a particular entry. For example, the position of a row in world population table 210 can be the same as the position of a corresponding column value in the attribute vectors. By adding a value ID which is not an index or position to the Dictionary, and a reference to it from the attribute vector, it is not necessary anymore to rebuild the attribute vector the drawback is the need to have two dictionaries to maintain the speed of lookups. As the current model, attribute vectors still reference by position to the rows in the world population table, so that position "x" in the world population table is represented with position "x" of every attribute vector.

Figure 8:
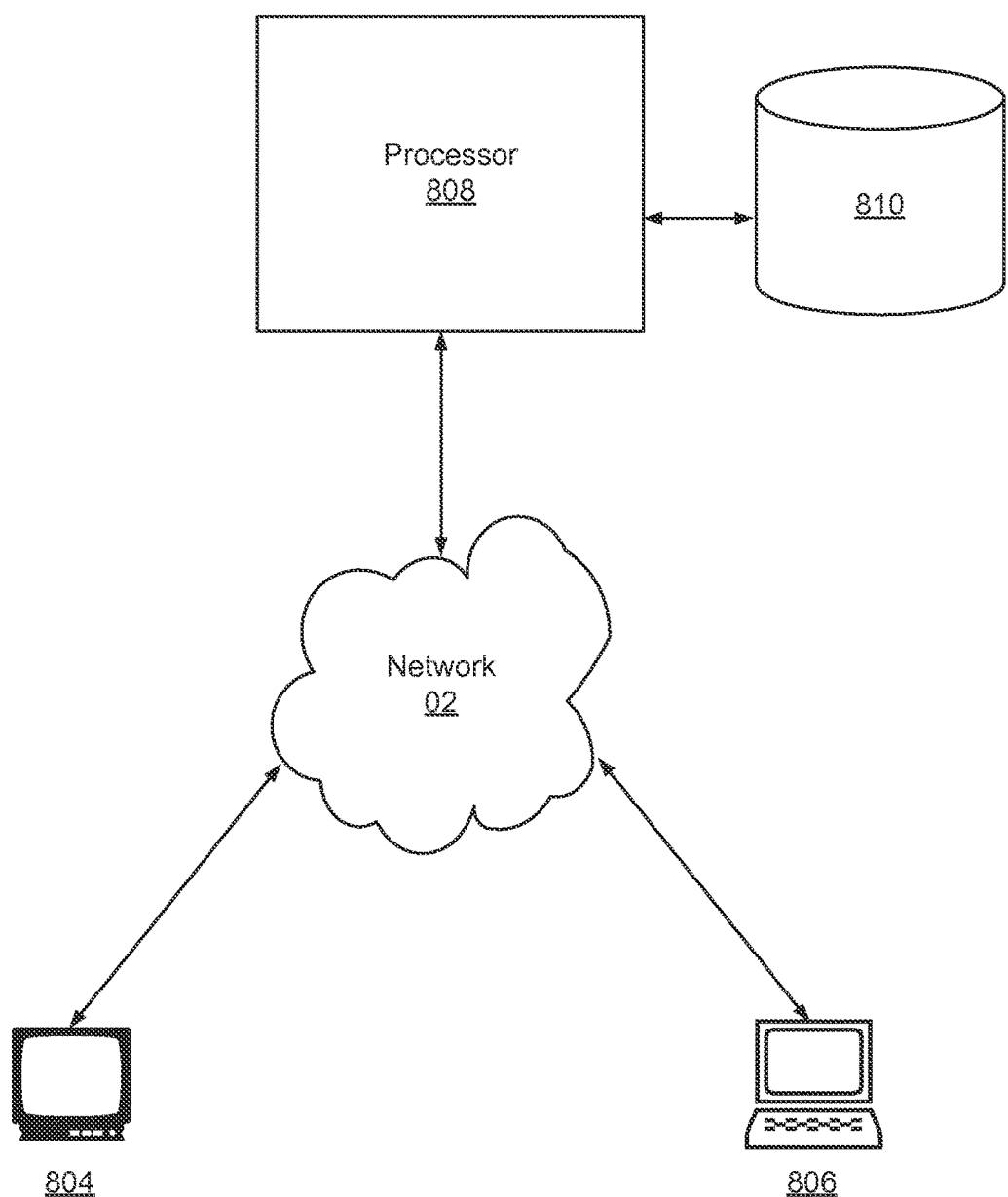
FIG. 8 is a block diagram of a system implementing the methods and systems described herein and according to an example embodiment.

FIG. 8 shows an example system 800 that includes a processor 808 in communication with a computer-readable medium 810. The computer readable medium 810 can be a database internal to the processor 808, external to the processor 808, external server, or external storage means. The computer-readable medium 810 can include instructions executable by the processor 808, such that, when the processor 808 executes various portions of the instructions, the instructions cause the processor 808 to perform the various methods described herein. The example system further includes terminals 804 and 806. For example, one terminal 804 can be used by a front-end user to interact with system 800, and the other terminal 806 can be used by a back-end user to interact with the system 800. The processor 808 and clients 804 and 806 can be in communication via network 802, which can be the Internet. Each of the clients 804 and 806 can access the processor 808 and any applications stored thereon via the network 802.

It should be appreciated that the present invention can be implemented in numerous ways, including as a process, an apparatus, a system, a computer processor executing software instructions, a mobile device, a smart device, a mobile application, or a computer readable medium such as a computer readable storage medium, or a computer network wherein program instructions are sent over optical or electronic communication or nontransitory links. It should be noted that the order of the steps of disclosed processes can be altered within the scope of the invention, as noted in the appended Claims and in the description herein.

Although the foregoing invention has been described in some detail for purposes of clarity of understanding, it will be apparent that certain changes and modifications can be practiced within the scope of the appended claims. The present invention can be practiced according to the claims without some or all of these specific details. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A method for retrieving data from a data structure, the method comprising:
   receiving, by a computer processor, a query for the data;
   searching, by the computer processor, for the data in an encoding dictionary of the data structure, a first copy of the encoding dictionary stored both in a main store, and a second copy of the encoding dictionary stored in a differential buffer;
   responsive to finding a matching value for the data in the encoding dictionary, determining, by the computer processor, a value identifier (valueID) corresponding to the matching value based on lookup in the encoding dictionary, each valueID specifying a location in a table of a corresponding record;
   determining, by the computer processor, all positions corresponding to the valueID in at least one attribute vector of the data structure, the at least one attribute vector stored in an index;
   retrieving, by the computer processor, additional valueIDs corresponding to the determined positions in other attribute vectors of the data structure;
   storing, by the computer processor, all of the valueIDs corresponding to the determined positions;
   looking up, by the computer processor, the stored valueIDs in a decoding dictionary of the data structure; and
   returning, by the computer processor, all results corresponding to the stored valueIDs.

2. The method of claim 1, further comprising, responsive to finding the matching value for the data in the encoding dictionary, modifying, by the computer processor, the matching value in the encoding and decoding dictionaries.

3. The method of claim 2, wherein the modification is performed according to an instruction received by the computer processor.

4. A method for adding data to a data structure, the method comprising:
receiving, by a computer processor, an instruction to insert data into a table of an insert-only in-memory database;
adding, by the computer processor, the data to each of an encoding dictionary and a decoding dictionary of the data structure, a first copy of each of the encoding dictionary and the decoding dictionary stored in the main store, and a second copy of each of the encoding dictionary and the decoding dictionary stored in the differential buffer;
assigning by the computer processor, a value identifier (valueID) for the added data in each of the encoding and decoding dictionaries, the valueID specifying a location in the table of a corresponding record; and
adding, by the computer processor, the valueID into an attribute vector corresponding to the encoding and decoding dictionaries in the data structure, the attribute vector stored in an index;
wherein, for each column in the table, there are separate and different encoding dictionaries, decoding dictionaries and attribute vectors.

5. The method of claim 4, further comprising sorting, by the computer processor, the encoding dictionary by the added data.

6. The method of claim 5, wherein the sorting is performed after adding a unique value to encoding dictionary.

7. The method of claim 5, wherein the sorting is performed periodically.

8. The method of claim 4, wherein the valueID for the added data is added at the bottom of the attribute vector and the attribute vector is not rebuilt.

9. The method of claim 4, further comprising determining, by the computer processor, that the data instructed to be added does not already exist in the database;
wherein the data is added responsive to the determination that the data does not already exist in the database.

10. A non-transitory computer-readable storage device storing program instructions that, when executed, cause an executing device to perform a method, comprising:
receiving, by a computer processor, an instruction to insert data into a table of an insert-only in-memory database;
responsive to a determination by the computer processor that the data does not already exist in an encoding dictionary and a decoding dictionary of a data structure, adding, by the computer processor, the data to each of the encoding and decoding dictionaries, a first copy of each of the encoding dictionary and the decoding dictionary stored in the main store and a second copy of each of the encoding dictionary and the decoding dictionary stored in the differential buffer;
assigning by the computer processor, a value identifier (valueID) for the added data in each of the encoding and decoding dictionaries, the valueID specifying a location in the table of a corresponding record; and
adding, by the computer processor, the valueID into an attribute vector corresponding to the encoding and decoding dictionaries in the data structure, the attribute vector stored in an index;
wherein, for each column in the table, there are separate and different encoding dictionaries, decoding dictionaries and attribute vectors.

11. The computer-readable storage device of claim 10, wherein the method further comprises sorting, by the computer processor, the encoding dictionary by the added data.

12. The computer-readable storage device of claim 11, wherein the sorting is performed after adding a unique value to encoding dictionary.

13. The computer-readable storage device of claim 11, wherein the sorting is performed periodically.

14. The computer-readable storage device of claim 10, wherein the attribute vector is not rebuilt.

15. The computer-readable storage device of claim 10, wherein the encoding dictionary and the decoding dictionary correspond to each other and each includes same entries.

16. The computer-readable storage device of claim 11, wherein the sorting is responsive to addition of new data to the data structure.

17. The computer-readable storage device of claim 11, wherein the decoding dictionary is never sorted.

18. A computer system to add data in a data structure, comprising:
a computer processor to:
receive an instruction to insert data into a table of an insert-only in-memory database;
responsive to a determination by the computer processor that the data does not already exist in an encoding dictionary and a decoding dictionary of the data structure, add the data to each of the encoding and decoding dictionaries;
assign a value identifier (valueID) for the added data in each of the encoding and decoding dictionaries, the valueID specifying a location in a table of a corresponding record; and
add the valueID into an attribute vector corresponding to the encoding and decoding dictionaries in the data structure; and
a memory to:
store a first copy of each of the encoding dictionary and the decoding dictionary in a main store;
store a second copy of each of the encoding dictionary and the decoding dictionary in a differential buffer; and
store the attribute vector in an index,
wherein, for each column in the table, there are separate and different encoding dictionaries, decoding dictionaries and attribute vectors.

19. The computer system of claim 18, wherein the computer processor further sorts encoding dictionary by the added data.

20. The computer system of claim 19, wherein the computer processor further sorts encoding dictionary after adding a unique value to the encoding dictionary.

21. The computer system of claim 18, wherein the computer processor further sorts encoding dictionary periodically.

22. The computer system of claim 18, wherein the attribute vector is not rebuilt.

23. The computer system of claim 18, wherein the encoding dictionary and the decoding dictionary correspond to each other and each includes same entries.

24. The computer system of claim 18, wherein the computer processor further sorts encoding dictionary responsive to addition of new data to the data structure.

25. The computer system of claim 18, wherein the decoding dictionary is never sorted.

* * * * *